UNITED STATES PATENT OFFICE.

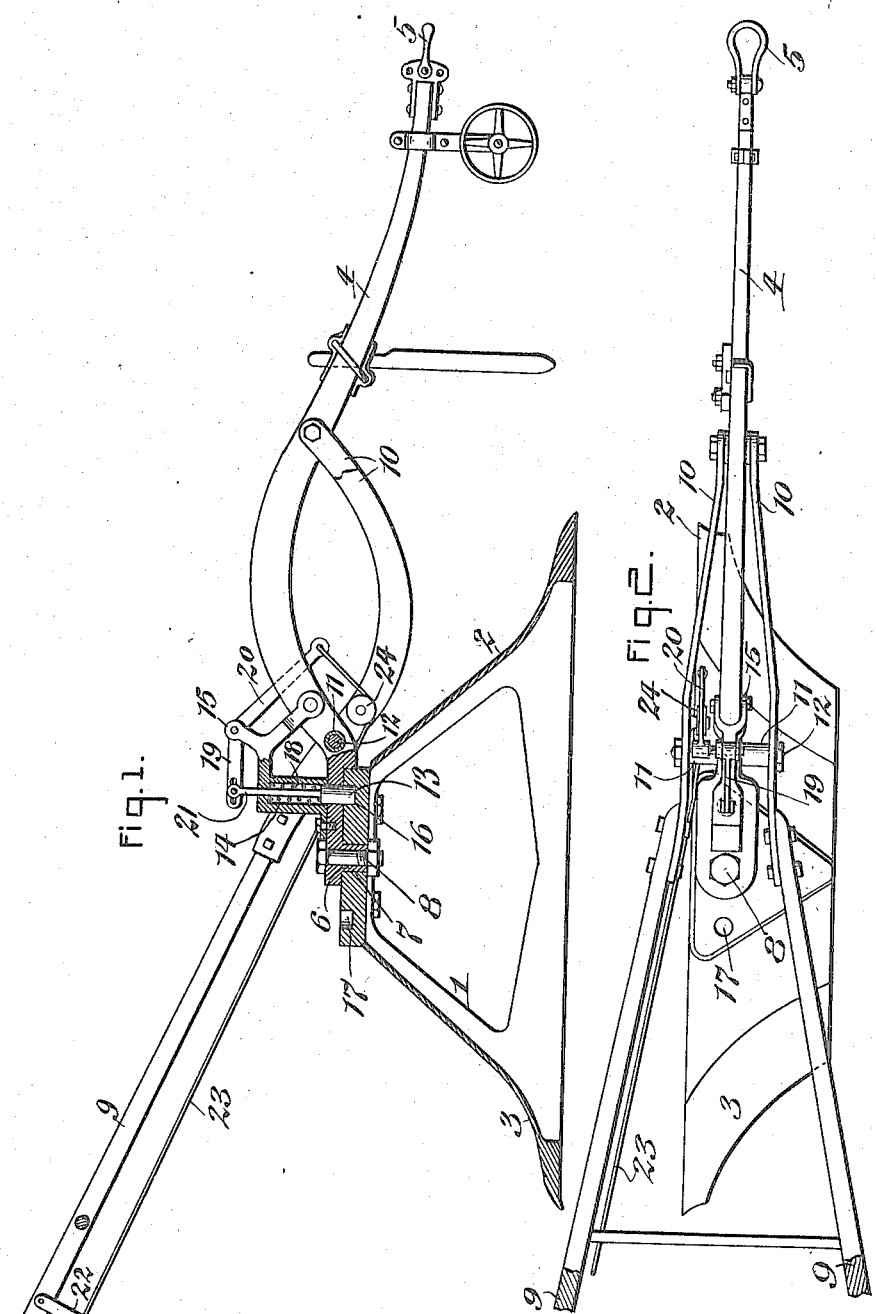

SALVATORE SEDITA, OF BRANT, NEW YORK.

PLOW.

1,207,640.                Specification of Letters Patent.        Patented Dec. 5, 1916.

Application filed July 1, 1914.   Serial No. 848,411.

*To all whom it may concern:*

Be it known that I, SALVATORE SEDITA, a citizen of Italy, residing at Brant, in the county of Erie and State of New York, have invented new and useful Improvements in Plows, of which the following is a specification.

This invention relates to plows and has for its object the production of an animal drawn implement of this character in which the draft beam to which the animal is attached may be reversed on the standard which carries the shares without necessitating the reversal of the standard for this purpose.

In the accompanying drawings: Figure 1 is a vertical longitudinal section of a plow constructed in accordance with my invention. Fig. 2 is a top plan view thereof, partly in section.

Similar characters of reference indicate corresponding parts throughout both figures.

1 represents the lengthwise elongated standard of the plow which is provided centrally on its upper side with a flat head and at its opposite ends with plow shares 2, 3 which project lengthwise in opposite directions from the standard. Pivotally connected with the head of the standard so as to be capable of turning horizontally relatively thereto is a draft beam 4 which may be variously constructed but which, as shown in the drawings, is preferably constructed from a single bar which is bent upwardly between its front and rear ends. At its front or outer end the beam is provided with a clevis 5 for attaching a draft animal thereto while its rear or inner end is provided with a tubular vertical arbor 6 which turns horizontally in a vertical bearing 7 formed centrally in the head of the standard. The draft beam and head of the standard are held against vertical displacement relatively to each other by means of a vertical pivot bolt 8 extending through the hollow arbor and bearing with its head against the upper side of the draft beam while its nut bears against the underside of the standard head.

Various means may be provided for manually controlling or directing the plow those shown in the drawings comprising two handles arranged on opposite sides of the plow standard and having their rear parts or sections 9, 9 constructed of wood while their front parts or sections 10, 10 are constructed of metal and secured to opposite sides of the draft beam. The front sections of the handles are preferably attached at their front ends to the beam while their intermediate parts are connected with the beam adjacent to the standard head and those portions of these front sections between front and intermediate connections with the draft beam are bent downwardly, as shown in Fig. 1, so as to operate as braces for stiffening and strengthening the beam without making the same unduly heavy. The rear connection between the rear part of the draft beam and the front handle bar sections preferably comprises spacing sleeves 11, 11 interposed between opposite sides of the draft beam and the adjacent front handle sections, and a horizontal coupling bolt 12 passing transversely through these sleeves, the draft beam and the front handle sections, thereby holding the handles securely in spaced relation to the draft beam adjacent to the pivotal connection between the draft beam and the plow standard.

By swinging the draft beam horizontally on the standard the same may be projected laterally from the standard in a direction lengthwise above one of the plow points or shares for pulling the plow in one direction and turning the furrows toward one side of the standard during this movement and the draft beam may also be turned so that it projects lengthwise from the standard over the other plow point or share so that upon pulling the plow the last mentioned point will be drawn forwardly through the ground and cause the furrow to be turned from the same side of the standard, thereby avoiding the necessity of removing the plow standard from the ground or turning the same horizontally while moving over the field alternately in opposite directions. Means are provided for interlocking the standard and draft beam in either of these two positions which means may be variously constructed but those shown in the drawings are suitable and preferred and comprise a vertically movable locking bolt 13 guided in a way or pocket 14 formed partly in the draft beam adjacent to its arbor and partly in a bracket 15 secured to the adjacent part of the draft beam and adapted to engage its lower end in one of two locking recesses 16, 17 formed in the upperside of the standard head on diametrically opposite sides of the pivotal connection between the draft beam and plow standard. The locking bolt is yieldingly held in its depressed or operative position by means of a spring 18 arranged in the guideway 14 and bearing at its upper end against the top of this guideway while its lower end bears against said locking bolt, as shown in Fig. 1. The locking bolt may be lifted for disengaging the same from the respective locking recess by means which preferably comprise a vertically swinging lever 19, 20 pivoted on the upper part of the bracket, an upright lifting rod 21 connected at its lower end with the locking bolt and at its upper end with the rear arm 19 of the rock lever while its intermediate part is guided on the bracket, a hand lever 22 pivoted on the rear end of one of the plow handles so as to swing vertically, and a shifting cord or line 23 connected at its rear end with the hand lever while its front end is connected with the front arm 20 of the rock lever and passes with its intermediate part around a guide roller 24 on the front section of one of the plow handles. The front rock arm 20 is arranged between one side of the draft beam and the adjacent front section of one of the plow handles while the rear rock arm 19 is arranged over the rear part of the draft beam, as shown in Fig. 2, thereby permitting the locking bolt to be placed directly in line with the draft of the beam but permitting the operating connections for this locking bolt to clear the draft beam and extend to one of the handles of the plow, whereby the farmer or operator can direct the plow and operate the lock by one hand while his other hand may be employed in driving the horse or other draft animal.

My improved plow is very simple in construction, its cost of manufacture is substantially the same as that of an ordinary plow and owing to the convenience and facility with which the same can be reversed without turning the standard horizontally much labor is saved and a greater acreage can be plowed within a given time than is possible by the use of plows as heretofore constructed.

I claim as my invention:

A plow comprising a standard having plow shares at its opposite ends and a head which is provided with a central pivot opening extending vertically from the upper to the lower side of the head and also with locking openings extending downwardly from the top of the head on opposite sides of said pivot opening, a draft beam having its rear part resting on the top of said head and provided with an integral hollow pivot sleeve or arbor which projects downwardly from said beam and is journaled in said pivot opening, a coupling bolt extending through said hollow pivot sleeve or arbor and having a head and nut one of which bears against the top of said beam and the other against the underside of said standard head, a bracket mounted on said beam on one side of said pivot sleeve, and a spring pressed catch mounted on said bracket and adapted to engage with one or the other of said locking openings.

Witness my hand this 30 day of June, 1914.

SALVATORE SEDITA.

Witnesses:
   SEBASTIANO LOGRASSO,
   Rev. HACTOR SELLA.

Copies of this patent may be obtained for five cents each, by addressing the "Commissioner of Patents, Washington, D. C."